Figure 1:
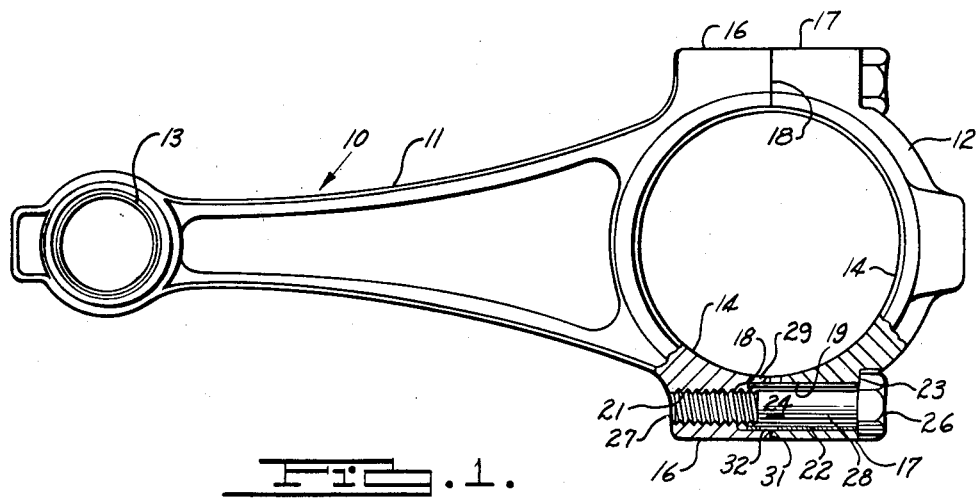

Nov. 6, 1962     D. D. DUESENBERG     3,062,596
CONNECTING ROD ASSEMBLY

Filed July 22, 1959

INVENTOR.
DENNY D. DUESENBERG
BY John R. Faulkner
Thomas H. Oster
ATTORNEYS 3,062,596
CONNECTING ROD ASSEMBLY
Denny D. Duesenberg, Dearborn, Mich., assignor to Ford Motor Company, Dearborn, Mich., a corporation of Delaware
Filed July 22, 1959, Ser. No. 828,801
3 Claims. (Cl. 308—74)

This invention relates to the mechanical field and is specifically concerned with a novel connecting rod assembly for use in reciprocating machinery such as internal combustion engines and compressors.

A primary object of this invention is to provide a connecting rod assembly consisting of a cap and a connecting rod which may be positively assembled together without misalignment in a minimum amount of time at a minimum of cost.

Another object of this invention is to provide means by which a connecting rod and its mating cap may be assembled together at an early stage of manufacture to facilitate the remaining manufacturing operations.

Still another object is to provide attachment and alignment means between a connecting rod and its mating cap which is dependable in construction, adaptable to mass production techniques, economical to manufacture, and usable without weakening the assembled device.

Still a further object is to provide alignment and attachment means for a connecting rod and cap which comprises a hollow alignment member received in the mating faces of the connecting rod and cap with conventional bolting means extending through the hollow member for securing the pieces together.

In the construction of this invention a connecting rod assembly forged either as a one-piece construction or as a two-piece construction may be used. In a one-piece construction the connecting rod is forged with the cap portion integral and the cap is sawed off during the preliminary machining. In both constructions, the expensive close tolerance special bolt and nut assembly used in the prior art is eliminated and replaced by a standard bolt and a hollow member or split pin. An enlarged bore is drilled through the cap end sections and partially through the connecting rod. Extending substantially concentrically beyond this bore in the connecting rod end sections is a smaller diameter drilled and threaded hole for the reception of the threaded end of a standard bolt. The back spot facing required to provide bolt head room in the connecting rod is completely eliminated, thereby eliminating a potentially weak section of the connecting rod. If the connecting rod design is such that a back spot face is still required, this can be made concentric with the bolt hole whereas prior designs require the spot face to be eccentric in order to prevent the bolt head from turning. It is much easier, of course, to make a concentric spot face than an eccentric spot face.

After this initial drilling and tapping, a hollow member, which may be in the form of a split tubular member, etc. is driven through the cap bore with an extended portion extending into the connecting rod end section thereby aligning the members with respect to each other. A conventional bolt extends through the split pin and is threaded into the tapped hole in the yoke portion of the rod. Because the split tubular member frictionally holds the members in alignment, it is no longer necessary to provide a body bolt diameter of small tolerances, nor is it necessary to hold the body bolt diameter concentric with the bolt threaded end portion. Once the connecting rod and cap are held by the split pin, there is no relative movement between the connecting rod and cap and the bolt is used simply as a securing member.

Figure 2:
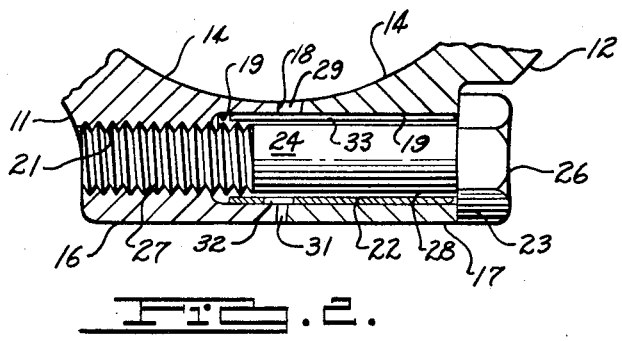

Other objects and advantages will become more apparent as this description proceeds particularly in connection with the accompanying drawings in which:

FIGURE 1 is an elevational view partly in section of a connecting rod and cap assembled in accordance with the invention; and FIGURE 2 is an enlarged fragmentary view in section of the connecting rod and cap through one of the bolt holes.

Referring now to the drawings and particularly to FIGURE 1, reference numeral 10 indicates generally a connecting rod and cap assembly embodying the invention. The assembly 10 comprises the usual connecting rod 11 and cap 12. Rod 11 has the usual wrist pin bearing 13 at one end. Cap 12 and connecting rod 11 are combined to form at the other end of the assembly a crankshaft crank pin bearing surface 14 machined between connecting rod and cap end sections 16 and 17 respectively. The end sections 16 and 17 abut at the parting line indicated at 18.

Referring now to FIGURE 2, the end sections 16 and 17 are provided with an enlarged bore 19 which extends completely through section 17 and partially through section 16. Concentric with the bore 19 and extending the remaining distance through the end section 16 is the smaller diameter tapped bore 21.

The alignment of the rod 11 and cap 12 end sections 16 and 17 is accomplished by the press fitting of a hollow member which is shown in the form of a split tubular member 22. Member 22 is press fitted into the end section 17 so that it extends slightly below the machined face 23 provided in the end section 17. Member 22 further extends outwardly beyond the interface 18 and a predetermined distance into the end section 16 short of the end of the bore 19. As will be noted, the alignment of the cap and the connecting rod is accomplished by simply taking the cap with the split tubular members inserted therein and forcing these split tubular members into the remaining portion of the bore 19 in the end sections 16.

The securing of the two members together is simply accomplished by the use of a bolt 24 whose head 26 bottoms on the machined face 23 and whose end threaded section 27 engages the threaded bore 21.

Side lubrication of the bearing is accomplished by providing openings 29 and 31 at the interface 18 between the cap and connecting rod end sections 16 and 17. A drilled aperture 32 is made in the split tubular member of a sufficient size so that it will permit oil to flow through the openings 29 and 31. The split tubular member may be positioned so that the longitudinal separation 33 normally provided in the member is opposite to aperture 32 which permits oil to pass through in the same manner as a drilled aperture 32. When the bolt 24 is torqued to the proper poundage, the connecting rod and cap will be aligned and secured together in a simple and dependable manner.

After the initial machining of the bottom edges of sections 16 and 17 has been done, the bores 19 and 21 drilled, and the split tubular members 22 are pressed in place, the connecting rod and cap may be quickly assembled and the remaining operations performed without fear of connecting rod and cap misalignment.

What is claimed is:

1. An assembly comprising a connecting rod, a connecting rod cap, a pair of split roll pins, and a pair of bolts, said connecting rod and connecting rod cap each having a pair of bores for the reception of said split roll pins and said bolts, said split roll pins being received in said bores and traversing the junction of the connecting rod and connecting rod cap to detachably hold said connecting rod and connecting rod cap whereby relative motion of the connecting rod and connecting rod cap in a direction radial with respect to said bores is prevented, one of said connecting rod and said connecting rod cap having a pair of openings at spaced apart points at the junction of the connecting rod and connecting rod cap communicating with each of the pair of bores and adapted to receive a supply of lubricant fluid, an aperture in each of said split roll pins, said split roll pins being arranged in said bores so that one of each pair of openings communicates with the split in the split pin and the other of said openings communicates with the aperture in each split pin, each of said bolts being received within each of said split roll pins in predetermined spaced apart relationship to said split roll pins defining a continuously open lubricant fluid flow passage of lubricant fluid from one of the openings in one of said connecting rod and connecting rod cap through the split roll pin to the other of said openings in the connecting rod and connecting rod cap.

2. An assembly comprising a connecting rod, a connecting rod cap, a pair of hollow members, and a pair of bolts, said connecting rod and connecting rod cap each having a pair of bores for the reception of said hollow members and said bolts, said hollow members being received in said bores and traversing the junction of the connecting rod and connecting rod cap to detachably hold said connecting rod and connecting rod cap whereby relative motion of the connecting rod and connecting rod cap in a direction radial with respect to said bores is prevented, a pair of openings provided in said connecting rod and said connecting rod cap at spaced apart points at the junction of the connecting rod and connecting rod cap communicating with each of the pair of bores and adapted to receive a supply of lubricant fluid, a pair of apertures provided in each of said hollow members, said hollow members being arranged in said bores so that one of each pair of openings communicates with one of each aperture in each hollow member, each of said bolts being received within each of said hollow members in predetermined, spaced apart relationship to said hollow members defining a continuously open lubricant fluid flow passage of lubricant fluid from one of the openings in the connecting rod and connecting rod cap through the apertures in the hollow member to the other of said openings in the connecting rod and connecting rod cap.

3. An internal combustion engine comprising a connecting rod, a connecting rod cap, a bore in said connecting rod, a bore in said connecting rod cap aligned with the bore in said connecting rod, one of said bores extending through the member in which it is formed and the other of said bores extending at least partially through the member in which it is formed, fastening means received in said aligned bores securing said connecting rod and connecting rod cap against displacement along the axis of said fastening means, said connecting rod and said connecting rod cap being secured against displacement radially with respect to said fastening means by a tubular member received in said aligned bores and extending across the interface between said connecting rod and said connecting rod cap, said tubular member being longitudinally slotted to provide diametral resilience therefor and permit said tubular member to be compressed diametrally upon insertion into said aligned bores from either end of at least one of said bores and maintained in frictional engagement with said aligned bores by its resilience.

References Cited in the file of this patent

UNITED STATES PATENTS

| | | |
|---|---|---|
| 2,239,834 | Williams | Apr. 29, 1941 |
| 2,560,413 | Carlson | July 10, 1951 |
| 2,652,297 | Stearns et al. | Sept. 15, 1953 |
| 2,872,156 | Brown | Feb. 3, 1959 |